June 22, 1937.   S. S. ROSENBAUM   2,084,359
AUTOMATIC MEAT STOMPER
Filed March 27, 1936
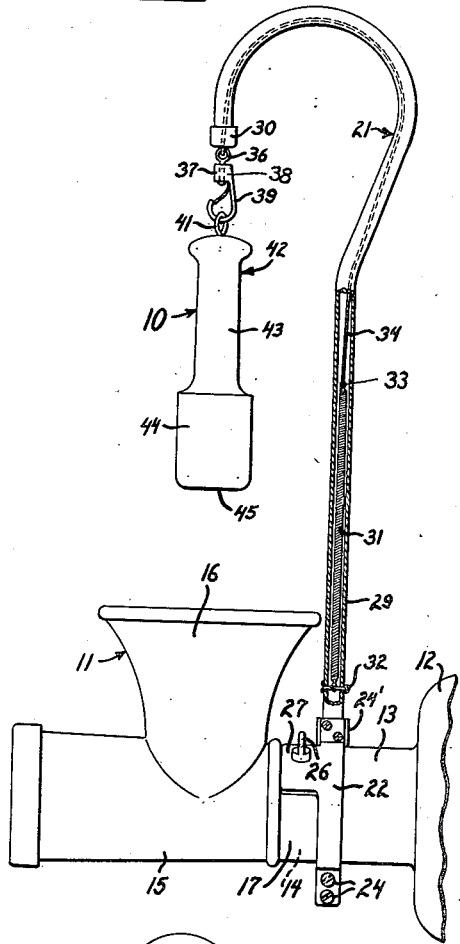
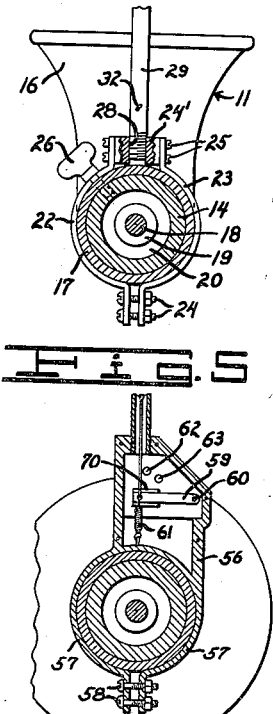
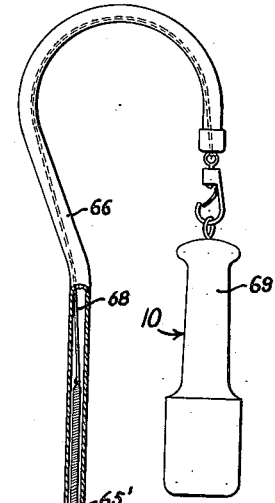
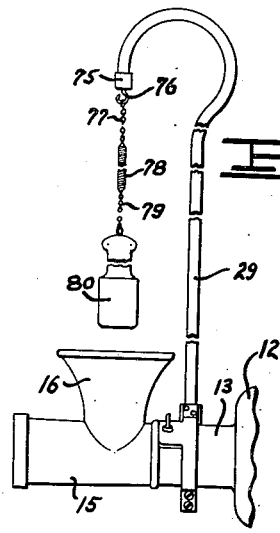
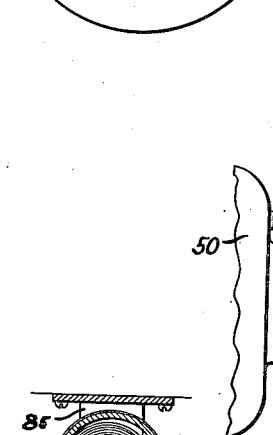
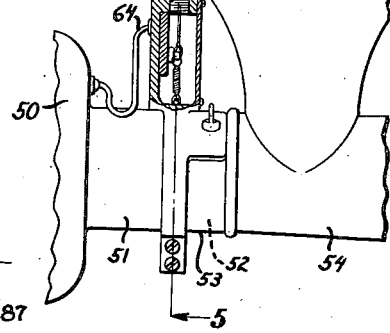
INVENTOR.
S. S. ROSENBAUM.
BY
ATTORNEY.

Patented June 22, 1937

2,084,359

UNITED STATES PATENT OFFICE 2,084,359

AUTOMATIC MEAT STOMPER

Samuel S. Rosenbaum, Pasadena, Calif., assignor to Joseph Wintroub, Los Angeles, Calif.

Application March 27, 1936, Serial No. 71,199

6 Claims. (Cl. 146—182)

This invention relates to meat stompers.

The general object of the invention is to provide an improved meat stomper for use in forcing meat to be ground into a grinding machine.

A more specific object of the invention is to provide a grinding machine having a meat stomper mounted thereon in such fashion that it may be moved to operative position when desired and when released will return to normal position.

Another object of the invention is to provide a meat grinding machine including a motor control together with a meat stomper and wherein switch means is provided whereupon movement of the meat stomper to operative position causes the control switch to the motor to be closed so that the motor will operate.

Other objects and the advantages of my invention will be apparent from the following description taken in connection with the accompanying drawing, wherein:

Fig. 1 is a side elevation, partly in section, showing my stomper;

Fig. 2 is a central, sectional view through the supporting bracket;

Fig. 3 is a fragmentary, sectional view showing the end of the support;

Fig. 4 is a side elevation, partly in section, showing a modified form of my invention;

Fig. 5 is a view taken on line 5—5 of Fig. 4;

Fig. 6 is a side elevation showing another modification of my invention; and

Fig. 7 is a central, sectional view showing a further modification.

In the practice of meat grinding it is customary to provide a meat stomper by means of which the pieces of meat to be ground are forced into the hopper by means of a stomper and heretofore it has frequently happened that careless workmen will for various reasons fail to use the stomper and will endeavor to force the meat into place with their fingers with frequent injury and it is my object to overcome this difficulty and also prevent misplacement of the stomper and delays in securing the same.

In overcoming these difficulties I have devised a meat stomper which is indicated generally, in the accompanying drawing, at 10. As shown the stomper is mounted on a meat grinder which is indicated generally at 11 and includes a motor housing 12 from which a sleeve 13 projects. This sleeve has a reduced end 14. A grinding head is indicated at 15 and includes a hopper 16 and a sleeve 17 which fits over the reduced end 14 of the motor housing sleeve 13. The motor has a shaft 18 thereon and the grinding head and motor may be connected through such means as a pair of coupling sleeves 19 and 20 although the features of such coupling form no part of the present invention.

A supporting bracket is indicated generally at 21 as comprising a pair of clamp members 22 and 23 which are held in place at the bottom by bolts 24. The upper ends of the members 22 and 23 engage a block 24' and are held upon the block by screws 25. A clamping screw 26 passes through a projection 27 on the clamping member 22 and through aligned apertures in the sleeves 14 and 17. This clamping screw serves to hold the removable grinder head upon the machine while the supporting bracket 21 serves to hold the stomper upon the grinder head.

The block 24' is threaded as at 28 to receive a hollow tube 29 which is bent in the shape of a shepherd's crook which is provided with a cap 30 at the free end. Secured within the tube 29 is a spring 31, one end of which is engaged by a removable fastening member 32 and the other end of which is secured at 33 to a flexible member 34 which may be of chain or wire.

This flexible member 34 at its other end engages the eye 36 of a swivel 37. This swivel 37 engages the end 38 of a harness snap 39. A rubber bumper member 40 may be arranged on the flexible member 34 adjacent the eye 36 as shown in Fig. 3. The harness snap 39 engages an eye 41 which is screwed into the end of a meat stomper 42. The meat stomper 42 may be made in the usual shape of metal or wood and includes a handle portion 43 and an enlarged portion 44 having a meat engaging end 45.

In use the operator starts the grinding machine and grasps the handle of the stomper extending the spring and pulling the stomper down from the normal position shown in Fig. 1. After using, the stomp is released and it immediately flies back to its position.

In Figs. 4 and 5 I show a modification of my invention. In this modification the motor housing is indicated generally at 50, and is provided with a sleeve 51 and a reduced portion 52 on which a sleeve 53 on the grinding portion 54 is mounted. The grinding portion 54 includes a hopper 55 and the arrangement of motor and grinder is similar to that previously described.

Mounted on the sleeve 53 is a switch housing 56 which includes downwardly projecting arms 57 which are secured together by bolts 58. The housing includes a switch 59 pivoted as at 60 which is urged downwardly in Fig. 5 by a spring 61 away from spaced contacts 62 and 63 which may be connected in any suitable manner through leads 64 with the motor in the housing 50. The switch 59 is connected by a wire or other flexible member 65 with a spring 65' arranged in a tube 66 which may be similar in all respects to the tube 29 previously described. The lower end of this tube 66 is threaded as at 67 in the top of the switch housing. The spring 65' is connected by a flexible member 68 with a stomper 69 which is similar to the construction previously described.

In operation the contact 63 is wired to a suitable source of electricity and the parts are assembled in the position shown in Fig. 4. Meat is then placed in the hopper 55 and the operator grasps the stomper 69 pulling down on the stomper and thus moving the flexible member 68 against the action of the spring 65' thus pulling the flexible member 65 and swinging the switch 59 about its pivot 60 until the contacts 62 and 63 are bridged by the circuit closing portion 70 on the switch 59 so that current is supplied to the motor.

The grinding operation continues until the operator has finished the work whereupon he releases the stomper 69 and the spring 65' thereupon pulls the stomper into released position. The tension of the spring 61 is such that in the position in the drawing this spring 61 overcomes the tension of the spring 65' and pulls the switch 59 to the position shown in Fig. 5 so that the circuit is broken.

In Fig. 6 the motor housing 12, sleeve 13, grinder head 15, and hopper 16 are as previously described, also the tube 29 is the same as that described in connection with Fig. 1. In this construction the end of the tube 29 is provided with a cap 75 on which an eye 76 is secured. On this eye is a flexible member shown as a chain which is connected to a spring 78 which is connected to a further flexible member 79 and the latter is connected to a stomper 80. In use the operator grasps the stomper pulling it to position against the spring 78 until the work is finished and then releases the stomper whereupon the spring 78 pulls it out of the way.

In Fig. 7 I show a modification of my invention wherein a bracket 85 supports a shaft 86 which in turn supports a drum 87. The bracket 85 includes a lower arm 88 which supports a pulley 89. A coil spring 90 is secured at its inner end to the shaft 86 and at its outer end to the drum 87 and is so arranged that it is constantly adjacent the drum in a clockwise direction. Mounted on the drum is a flexible member 91 which passes on the pulley 89 and has a stomper 92 secured at its lower end. In use the bracket 85 is made with a suitable support over a meat hopper and the stomper is grasped when it is desired to be used and is pulled against the tension of the spring 90 and when the grinding operation is finished it is released whereupon it returns to position.

From the foregoing description it will be apparent that I have provided a novel meat stomper which can be economically manufactured and which is highly efficient in use.

Having thus described my invention I claim:

1. In a meat grinder, a housing and a hopper, a bracket, means to secure said bracket to said housing, a block on said bracket, said block including an aperture, a tube having one end thereof fixedly mounted in said block aperture, said tube extending upwardly from the block and terminating in an inverted U-shaped curved portion with the end of the U-shaped curved portion extending downwardly and disposed above the hopper, an extensible coiled spring in said tube, means to secure one end of said coiled spring to said tube adjacent to said block, said spring terminating intermediate the length of said tube, a flexible member attached to the end of said spring remote from said block, said flexible member extending through the U-shaped portion of said tube and a meat stomper on said flexible member.

2. In a meat grinder, a housing and a hopper, a bracket including a pair of spaced clamp members, means to secure said bracket to said housing, a block on said bracket, said block including an aperture, a tube having one end thereof fixedly mounted in said block aperture, said tube extending upwardly from the block and terminating in an inverted U-shaped curved portion with the end of the U-shaped curved portion extending downwardly and disposed above the hopper, an extensible coiled spring in said tube, means to secure one end of said coiled spring to said tube adjacent to said block, said spring terminating intermediate the length of said tube, a flexible member attached to the end of said spring remote from said block, said flexible member extending through the U-shaped portion of said tube, a swivel on the end of said flexible member, and a meat stomper connected to said swivel.

3. In a meat grinder, a housing and a hopper, a bracket including a pair of spaced clamp members, means to secure said bracket to said housing, a block on said bracket, said block including an aperture, a tube having one end thereof fixedly mounted in said block aperture, said tube extending upwardly from the block and terminating in an inverted U-shaped curved portion with the end of the U-shaped curved portion extending downwardly and disposed above the hopper, an extensible coiled spring in said tube, means to secure one end of said coiled spring to said tube adjacent to said block, said spring terminating intermediate the length of said tube, said tube having a closure on the end thereof above the hopper, said closure having an aperture therein, a flexible member attached to the end of said spring remote from said block, said flexible member extending through the U-shaped portion of said tube and through the aperture in said tube closure, a swivel on the end of said flexible member, a harness buckle on said swivel and a meat stomper mounted on said harness buckle.

4. In a meat grinder including a hopper, a housing, a motor, a pair of contacts in said housing connected to said motor and a switch adapted to engage said contacts, means normally urging said switch away from said contacts, a support on said meat grinder, a flexible member on said support, means to connect said flexible member to said switch so that when the flexible member is extended the switch will engage the contacts and the motor will operate, and a meat stomper mounted on said flexible member.

5. In a meat grinder, a hopper, a housing, a circuit to said motor including a pair of contacts in said housing, a pivoted switch adapted to engage said contacts, a spring normally urging said switch away from said contacts, a tube having one end thereof fixedly mounted in said housing, said tube extending upwardly from the housing and terminating in an inverted U-shaped curved portion with the end of the U-shaped curved portion extending downwardly and disposed above the hopper, a flexible member in said tube, means connecting one end of said flexible member to said switch, said flexible member extending through the U-shaped portion of said tube and a meat stomper mounted on said flexible member.

6. In a meat grinder, a hopper, a housing, a motor, a circuit to said motor including a pair of spaced contacts in said housing, a pivoted switch adapted in one position to bridge said contacts, a coiled spring normally urging said switch away from said contacts, a tube having one end thereof fixedly mounted in said housing, said tube including a vertically extending portion terminating in an inverted U-shaped curved portion with the end of the U-shaped curved portion extending downwardly and disposed above the hopper, an extensible coiled spring in said tube, said springs being in axial alignment, means to secure one end of said second mentioned coiled spring to said switch in said housing, said spring terminating intermediate the length of the vertically extending portion of said tube, said tube having a closure on the end thereof and above the hopper, said closure having an aperture therein, a flexible member attached to the end of said second spring remote from said switch, said flexible member extending through the U-shaped portion of said tube and through the aperture in said tube closure, a swivel on the end of said flexible member, a harness buckle on said swivel and a meat stomper mounted on said harness buckle.

SAMUEL S. ROSENBAUM.